(12) United States Patent
Wayman

(10) Patent No.: US 6,889,630 B1
(45) Date of Patent: May 10, 2005

(54) TRAILER MOUNTED AUTOMATIC LIVESTOCK FEEDING APPARATUS

(76) Inventor: Hugh D. Wayman, 3516 NW. 42nd St., Oklahoma City, OK (US) 73112

( * ) Notice: Subject to any disclaimer, the term of this patent is extended or adjusted under 35 U.S.C. 154(b) by 25 days.

(21) Appl. No.: 10/753,147

(22) Filed: Jan. 7, 2004

Related U.S. Application Data

(60) Provisional application No. 60/446,828, filed on Feb. 12, 2003.

(51) Int. Cl.[7] .............................................. A01K 1/00
(52) U.S. Cl. ................................................. 119/57.92
(58) Field of Search ........................ 119/51.01, 51.11, 119/52.1, 57.92, 408

(56) References Cited

U.S. PATENT DOCUMENTS

| | | | |
|---|---|---|---|
| 3,065,808 A * | 11/1962 | Dodgen ..................... 177/151 |
| 3,408,987 A * | 11/1968 | Rolfe ...................... 119/57.92 |
| 3,565,044 A * | 2/1971 | Sorrels ......................... 119/53 |
| 3,613,641 A | 10/1971 | Geerlings | |
| 3,678,902 A | 7/1972 | Ruth | |
| 3,742,913 A | 7/1973 | Crippen | |
| 3,782,333 A * | 1/1974 | Feterl ......................... 119/52.4 |
| 4,312,297 A * | 1/1982 | Roberts ........................ 119/53 |
| 4,334,502 A * | 6/1982 | Cox ............................. 119/53 |
| 4,401,057 A | 8/1983 | Van Gilst | |
| 4,989,547 A | 2/1991 | Eaton | |
| 5,209,183 A * | 5/1993 | Sampson .................... 119/53 |
| 5,237,962 A * | 8/1993 | Garman ...................... 119/58 |
| 5,275,129 A | 1/1994 | Vigesaa | |
| 5,463,980 A | 11/1995 | Rasmussen | |
| 5,732,652 A * | 3/1998 | Allen ....................... 119/57.91 |
| 5,908,007 A | 6/1999 | Duin | |
| 6,227,143 B1 * | 5/2001 | Papkov .................... 119/51.11 |
| 6,263,833 B1 * | 7/2001 | Runyan et al. .......... 119/51.11 |
| 6,427,628 B1 | 8/2002 | Reece | |
| 6,575,117 B1 * | 6/2003 | Rasmussen ............... 119/57.1 |
| 6,675,738 B1 * | 1/2004 | Kemnitz .................... 119/408 |

* cited by examiner

*Primary Examiner*—Teri Pham Luu
*Assistant Examiner*—Jordan Lofdahl
(74) *Attorney, Agent, or Firm*—Randal D. Homburg

(57) ABSTRACT

A trailer mounted automatic livestock feeder for feeding livestock in a field employing a timed feeding mechanism allows for a rancher to fill the feeder storage bin with bulk feed pellets at a bulk feed location and tow the feeder to location where livestock are feed and set a timer located on the feeder to feed livestock at a set time distributing a controlled amount of feed pellets to a perimeter trough located on the feeder trailer for several days, or until the amount of feed pellets are depleted. The feeder is provided with shielding that prohibits the livestock from access to the feeder storage bin, and is also provided with a rechargeable solar battery power supply allowing for use of the feeder in remote rural locations where there is no electrical power.

6 Claims, 6 Drawing Sheets

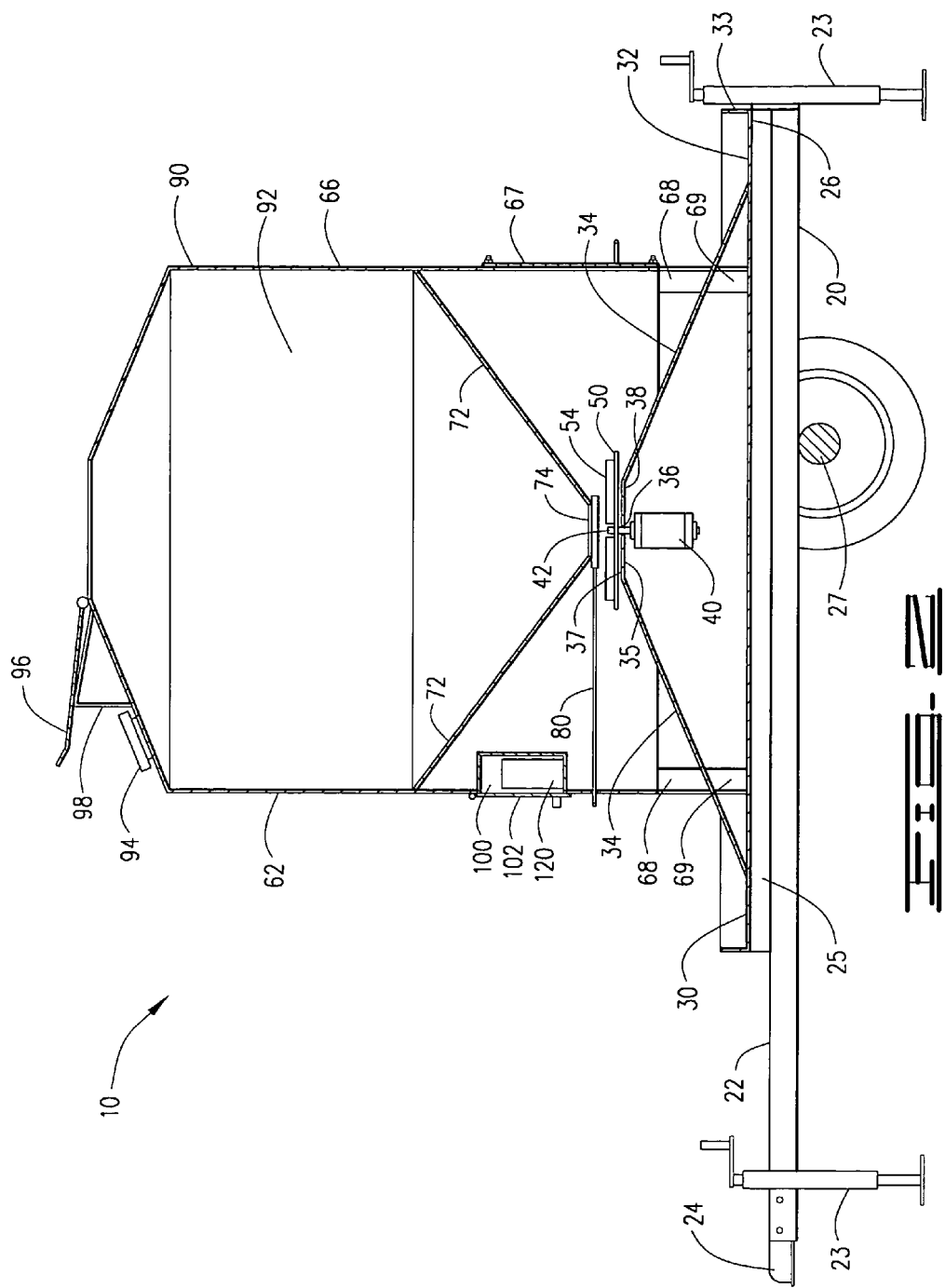

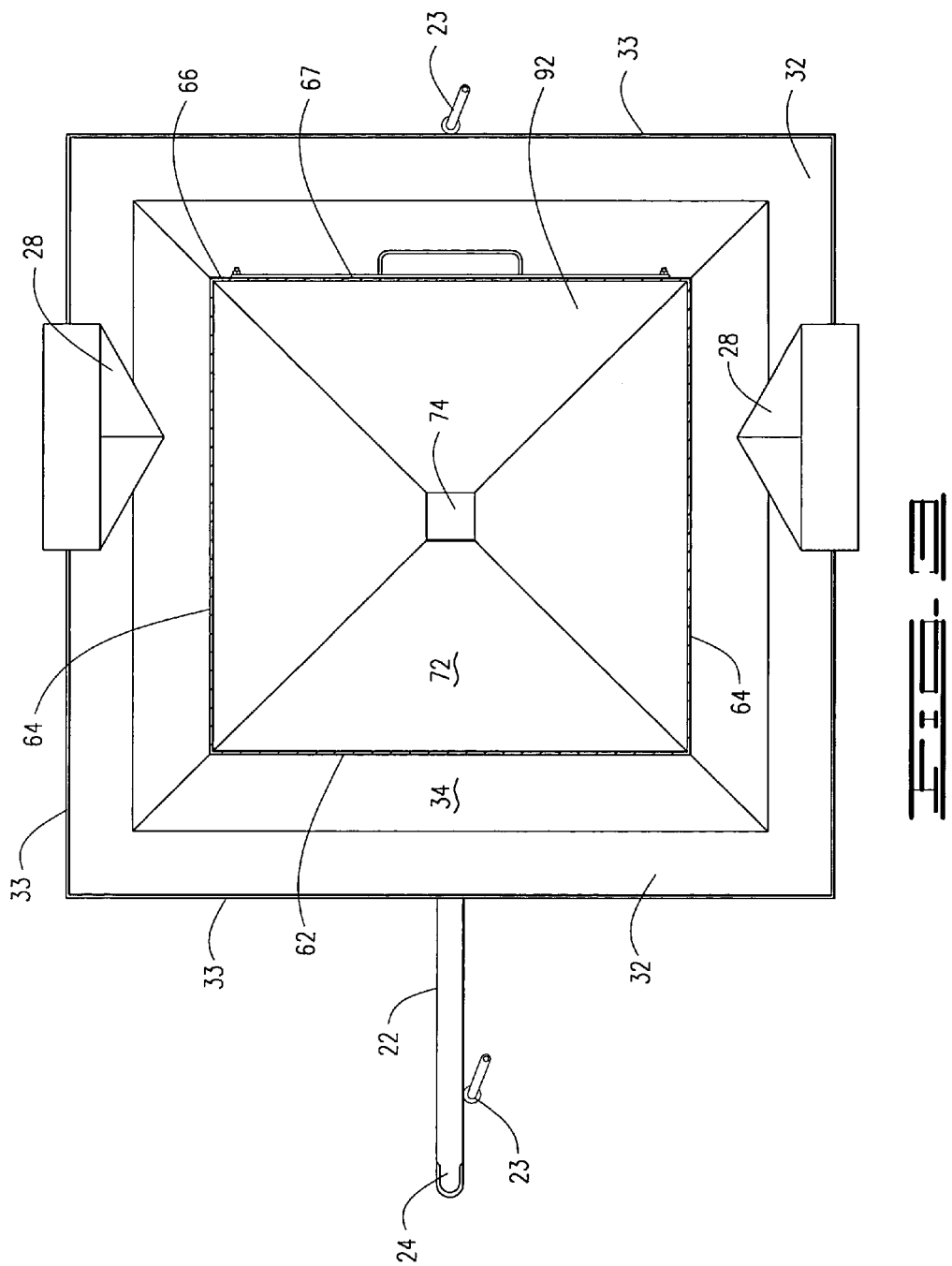

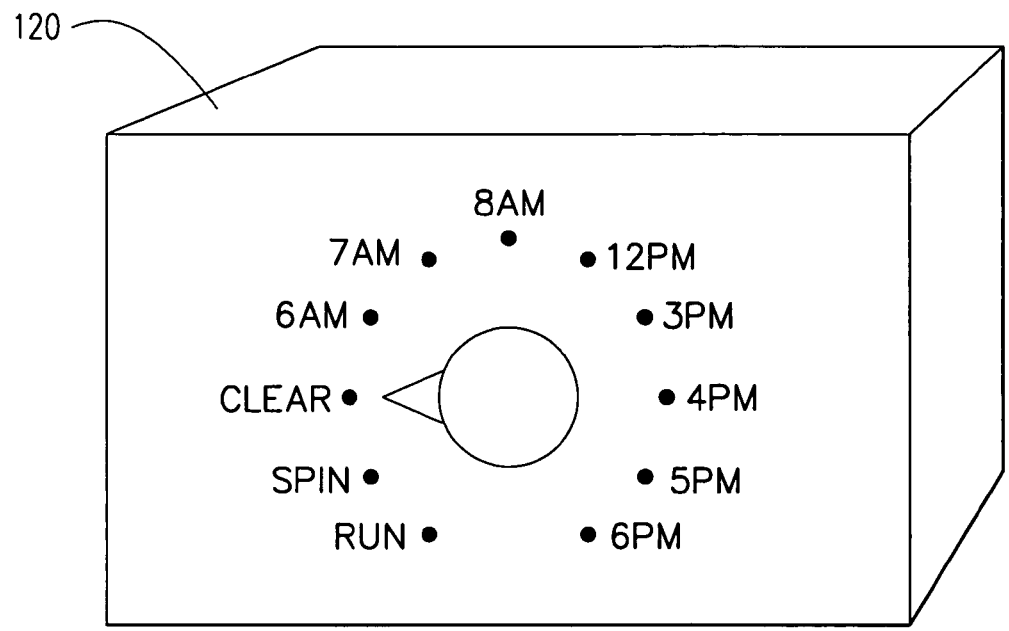
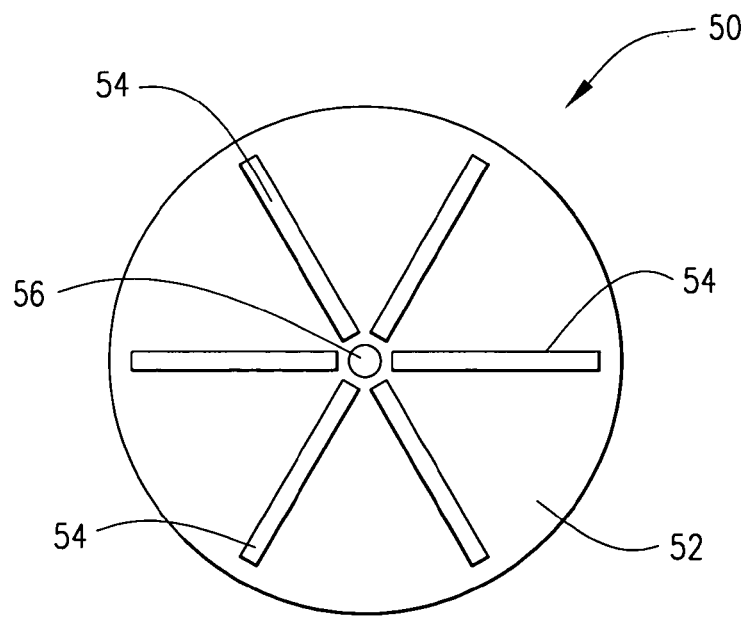

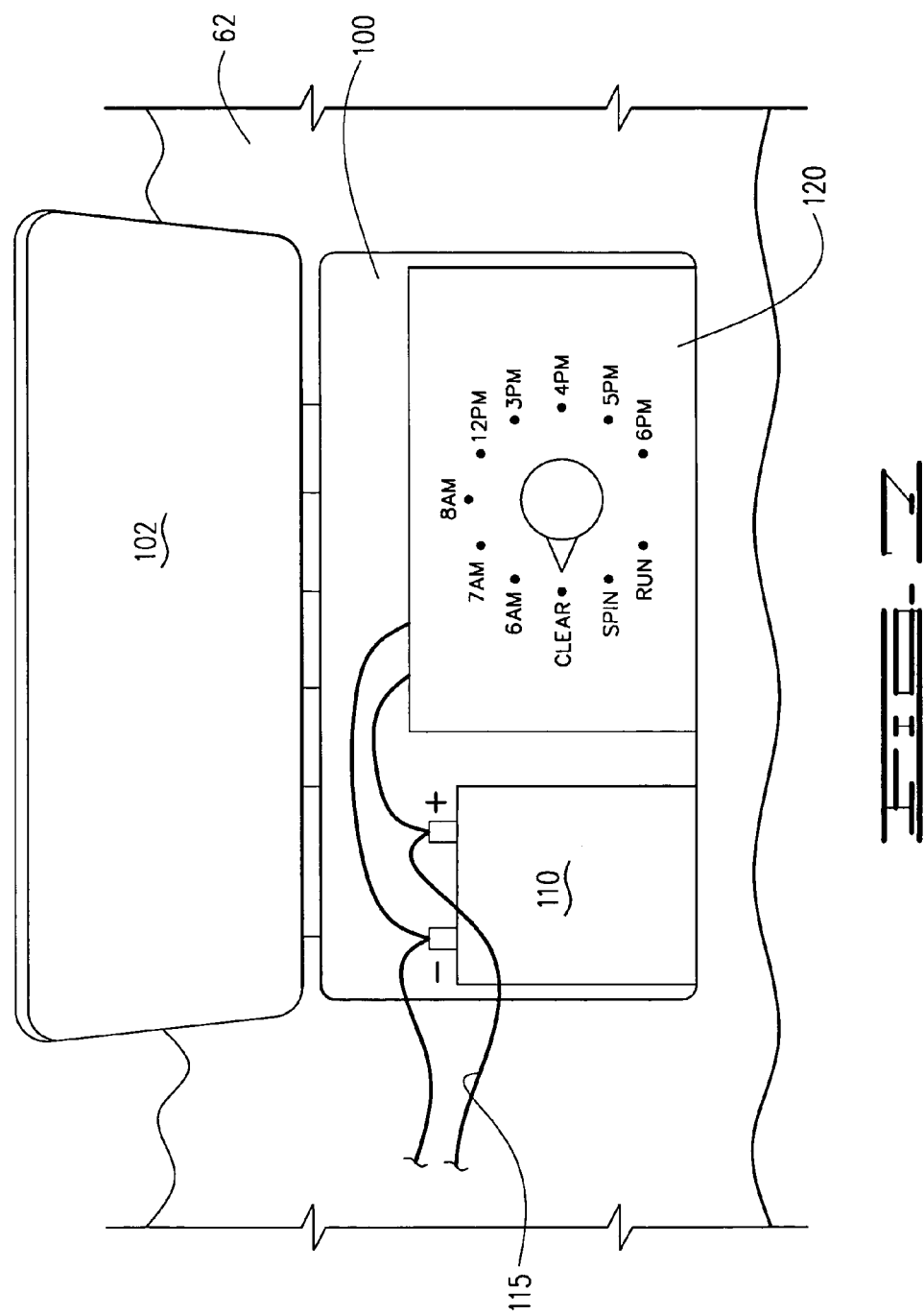

TRAILER MOUNTED AUTOMATIC LIVESTOCK FEEDING APPARATUS

CROSS REFERENCE TO RELATED APPLICATIONS

Provisional Patent Application Ser. No. 60/446,828, filed Feb. 12, 2003.

I. BACKGROUND OF THE INVENTION

1. Field of Invention

A trailer mounted automatic livestock feeder for feeding livestock in a field employing a timed feeding mechanism allows a rancher to fill the feeder storage bin with bulk feed pellets or granular feed products at a bulk feed location, tow the feeder to location where livestock are fed and to set a timer located on the feeder to feed livestock at a set time distributing a controlled amount of feed pellets to a perimeter trough located on the feeder trailer for several days, or until the amount of feed pellets are depleted. The feeder is provided with shielding that prohibits the livestock and wild animals from access to the feeder storage bin, and is also provided with a rechargeable solar battery power supply allowing for use of the feeder in remote rural locations where there is no electrical power.

2. Description of Prior Art

The following United States patents were discovered and are disclosed within this application for utility patent. All relate to livestock feeding devices or devices used to feed game. U.S. Pat. No. 3,742,913 to Crippen, discloses an automatic animal feeder that dispenses dry animal food at predetermined set time intervals, the feeder having a timer, a bin leading to a hopper having a funnel shaped bottom, a rotating turntable and a circular shelf that slants towards a leading trough. In U.S. Pat. No. 3,678,902 to Ruth, a timed animal feeder having a housing, slinger plate, additional skirt and timing via a light detector is disclosed.

Other notable patents located include U.S. Pat. No. 6,427,628 to Reece, U.S. Pat. No. 6,227,143 to Papkov, which includes a hopper, trough, splitter and timer, U.S. Pat. No. 5,908,007 to Dunn, which includes a solar power unit for a power supply, U.S. Pat. No. 5,275,129 to Vigesaa, which is solar powered and portable, and U.S. Pat. No. 4,989,547 to Eaton, which also includes solar power.

II. SUMMARY OF THE INVENTION

In the livestock business, especially in areas where the winters are long and severe, a means of providing feed to livestock without having to tend to the herd daily is desired in order to prevent daily feeding of cattle and also reducing the amount of human effort in delivering and dispensing pellet feed materials. It would serve the rancher to provide a device which could be filled with several days worth of pellet feed in bulk in a device that may be filled at a bulk feed location and taken to a remote rural area where livestock are kept and fed without the need to manually transfer or handle feed. The device would also be preferred as one which would maintain a measured feed supply for several days between filling the device with pellet feed and depleting the stored amount of pellet feed, making human intervention required only weekly or longer, depending on the size of the livestock herd. In addition, providing the device with a self-contained and replenishable power supply would allow for the device to operate without utility, fuel consumption or maintenance required with a fuel consuming engine.

The primary objective of the invention is to provide an automatic livestock feeding apparatus which is mounted on a trailer for portability which may be loaded with bulk amounts of pellet feed and transported to a rural location where the livestock are kept. A second objective is to provide the apparatus with a means of feeding a measured amount of pellet feed at a programmed time during the day which is adjusted to the size of the livestock herd and their daily feeding requirements. A third objective of the invention is to provide the apparatus in such size and volume as to allow for several days worth of automatic feeding with a replenishable power supply, preferably a rechargeable solar battery supply, which requires no external power supply.

Several other objectives and savings of time and effort are accomplished by the apparatus, including not having to travel from home to pasture for daily feeding, not having to handle feed sacks in the presence of hungry and sometimes aggressive livestock, the hazards of travel to pastures in inclement weather, and feed waste, since feed is dispensed and retained in the trough instead of on the ground where the livestock walk.

Further advantages include the apparatus being trailer mounted which means the device can be filled at the local feed store with bulkfeed, which is generally cheaper than bagfeed, and then hauled to the pasture for setup and feeding. The apparatus can be moved with the herd. The timer and solar battery require no present power source at the feeding location. At least one stabilizer jack prevents the livestock from moving or shaking the apparatus when set, and the enclosure of the bin structure prevents the apparatus from being raided by wild animals who might choose to feed on the livestock feed, the feed being limited to access at the trough only. In addition, the closure means on the bin structure allows for the storage bin to be shut during transport to prevent loss of feed during transport which would otherwise be jostled from the storage bin during movement and transport.

III. DESCRIPTION OF THE DRAWINGS

The following drawings are submitted with this utility patent application.

FIG. 2 is a side cross sectional view of the apparatus.

FIG. 3 is an upper view of the apparatus with the storage bin lid removed showing the internal portion of the storage bin.

FIG. 4 is a drawing of the timer mechanism.

FIG. 6 is a perspective view of the bin closure mechanism.

FIG. 7 is a front view of the battery and timer mechanism recess with the recess door open.

IV. DESCRIPTION OF THE PREFERRED EMBODIMENT

Figure 1:
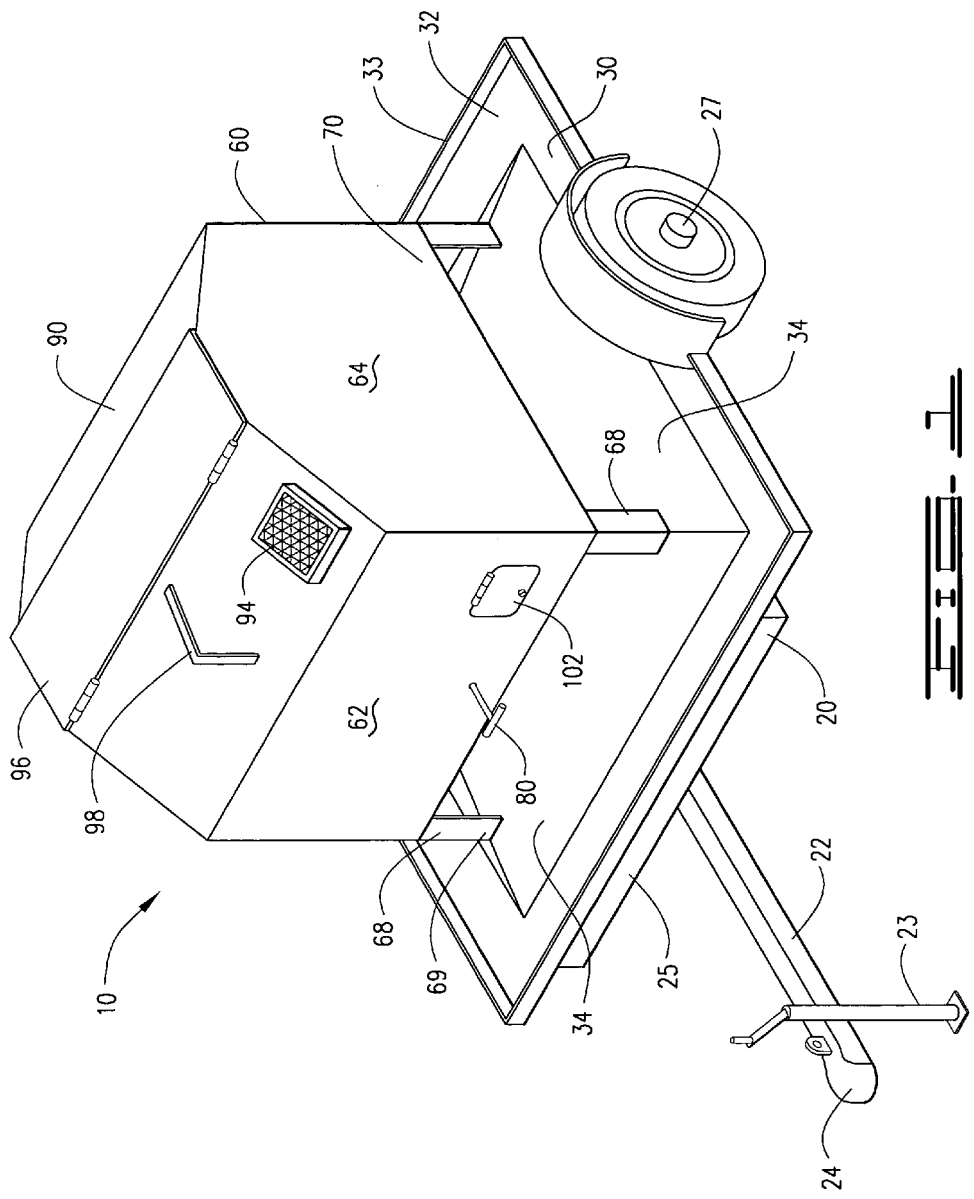
FIG. 1 is a front perspective view of the livestock feeding apparatus.
Figure 5:
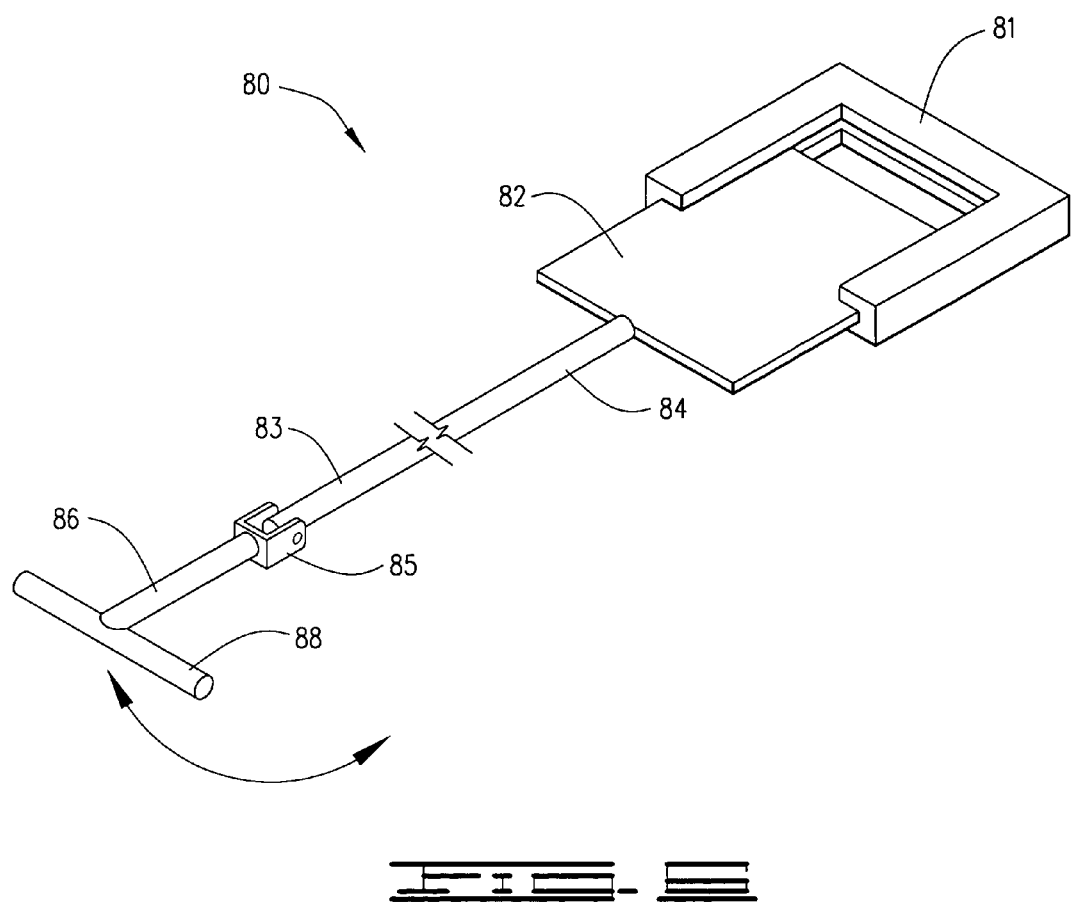
FIG. 5 is a top view of the lateral distribution plate.

A trailer mounted automatic livestock feeding apparatus 10 is provided for portable bulk pellet or granular feed distribution to livestock in remote rural pastureland, the apparatus 10 comprising a trailer portion 20, FIGS. 1–3, having a tongue 22, at least one stabilizer jack 23, a hitch 24, a bed 25, and at least one two wheeled-axle 27, the bed 25 having an upper surface 26 upon which is mounted a base 30, FIGS. 1–3, forming a trough 32 having an external ridge 33, a partial pyramid shaped incline ramp 34 terminating in a flat portion 35 having a central aperture 36, an upper surface 37 and a lower surface 38, FIG. 2, an electric motor 40 mounted to the lower surface 38 of the flat portion 35, the electric motor 40 having a drive shaft 42 projecting upward through the central aperture 36 of the flat portion 35, FIG. 2, a lateral distribution plate 50 having an upper surface 52 with a plurality of radial ridges 54, FIG. 5, the lateral distribution plate 50 also having a central bore 56 adapted to engage the drive shaft 42 of the electric motor 40, a bin structure 60, comprising a front section 62, two side sections 64 and a rear section 66 having a rear access panel 67, at least four outer support legs 68 which support the bin structure 60 over the incline ramp 34 leaving a slight space between the bin structure 60 and the incline ramp 34 sufficient to allow the passage of feed pellets or granular feed, FIGS. 1–2, the support legs 68 having a lower end 69 attached through the incline ramp 34 to the base 30 providing support to the bin structure 60, the bin structure 60 further having a lower portion 70 including a tapered tetrahedral bin floor section 72 terminating into a drop port 74, FIG. 3, which includes a manually operated closure means 80, FIG. 6, to open and close the drop port 74, and an upper portion 90 having a storage bin 92 defined by the front section 62, side sections 64, rear section 66 and bin floor section 72, the upper portion 90 having a solar cell 94, FIGS. 1–2, and a retractable storage bin door 96 providing access to the storage bin 92, the lower portion 70 further providing the front section 62 having a battery and timer mechanism recess 100 covered by a hinged recess door panel 102, the battery and timer mechanism recess 100, FIG. 7, containing a rechargeable solar battery 110 connected by electrical wiring 115 to the solar cell 94 on the upper portion 90, and a programmable timer 120, FIGS. 4 and 7, connected to the rechargeable battery 110 which provides electrical power to the electrical motor 40.

The trailer portion 20 is further defined as having ramped wheel wells 28 which prohibit feed from being trapped behind the wheel wells 28, directing any feed in an outward direction to the trough 32, as indicated in FIG. 3 of the drawings. The zipper portion 90 of the bin structure 60 is further defined as having a bin door retaining brace 98, FIG. 1-2, which serves to support the storage bin door 96 when open and also to protect the solar cell 94 from contact with the storage bin door 96 when the storage bin door 96 is being opened, also protecting the solar cell 94 from impact when loading the storage bin 92 with feed materials.

The closure means 80, shown in FIG. 5 of the drawings, at the drop port 74 is further defined as comprising a slotted drop port frame 81 attached to the drop port 74, a slide plate 82 slidably engaged with the slotted drop port frame 81, a slide plate arm 83 having a first end 84 attached to the slide plate 82, a second end 86 forming a handle 88 and an intermediate pivot joint 85 located between the first end 84 and second end 86. The second end 86 and handle 88 extend through the front section 62 as indicated in FIGS. 1–2.

More specifically, the apparatus 10 includes the following specifications for the components for the best mode of operation. In order for the storage bin 92 to contain sufficient feed for a long tern feeding without attendance, the storage bin 92 would ideally contain up to 2400 pounds of feed, requiring the inner dimensions of the storage bin 92 to be at least five feet by five feet square, plus the area of the tapered floor section 72. In order to support the weight of the apparatus 10 and the contained feed when full, the two wheeled axle 27 should be at least a 3500 pound axle with springs, and a 2" bull-dog type hitch is preferred as the hitch 24. The base 30 and bin structure 60 are preferably made from at least 12 gauge sheet metal and at least 3"×3"×3⁄16" angle iron. The drop port 74 dimensions are most preferably 6"×6".

The solar cell 94 should be at least a five watt solar cell and be located on the apparatus 10 as indicated in FIG. 1 for optimal exposure to the sun. The electrical motor 40 should be preferably a Dayton DC electrical motor that turns at 103 RPM, and the lateral distribution plate 50 should have a cross sectional diameter of at least 18", which would allow for approximately seven pounds of feed to be distributed to the trough 32 each second.

The programmable timer 120 should have a capability of feeding from one to eight times per day, depending on the size and feeding requirements of the livestock herd. The programmable timer 120 should also have the capability of adjusting the length of time of each feeding. The lateral distribution plate 50 may also include an outer peripheral rim (not shown) to prevent feed from being jostled off the upper surface 52. In addition to a stabilizer jack 23 on the tongue 22 of the trailer portion 20, a second stabilizer jack may be attached to the trailer portion 20 behind the bin structure 60, as shown in FIG. 2 of the drawings.

While the apparatus 10 has been particularly shown and described with reference to a preferred embodiment thereof, it will be understood by those skilled in the art that changes in form and detail may be made therein without departing from the spirit and scope of the invention.

What is claimed is:

1. A trailer mounted automatic livestock feeding apparatus for portable bulk pellet or granular feed distribution to livestock in remote rural pastureland, said apparatus comprising:

a trailer portion, having a tongue, at least one stabilizer jack, a hitch, a bed, and at least one two wheeled-axle, said bed having an upper surface;

a base forming a trough having an external ridge;

a partial pyramid shaped incline ramp terminating in a flat portion having a central aperture, an upper surface and a lower surface;

an electric motor mounted to said lower surface of said flat portion, said electric motor having a drive shaft projecting upward through said central aperture of said flat portion;

a lateral distribution plate having an upper surface with a plurality of radial ridges, said lateral distribution plate also having a central bore adapted to engage said drive shaft of said electric motor;

a bin structure, comprising a front section, two side sections, a rear section having a rear access panel, a lower portion and an upper portion;

at least four outer support legs which support said bin structure over said incline ramp, said support legs having a lower end attached to said base through said incline ramp;

said lower portion further comprising a tapered tetrahedral bin floor section terminating into a drop port which includes a manually operated closure means to open and close said drop port;

said upper portion further comprising a storage bin defined by said front section, side sections, rear section and bin floor section, a solar cell and a retractable storage bin door providing access to said storage bin; and said front section further comprising a battery and timer mechanism recess covered by a hinged recess door panel, said battery and timer mechanism recess containing a rechargeable solar battery connected by electrical wiring to said solar cell on said upper portion, and a programmable timer connected to said rechargeable battery providing electrical power to said electrical motor.

2. The apparatus as disclosed in claim 1, said trailer portion further comprising:

ramped wheel wells attached to said bed over said at least one two-wheeled axle, said wheel wells prohibiting feed from being trapped behind said wheel wells; and said at least one stabilizer jack comprising a stabilizer jack attached to said trailer portion behind said bin structure.

3. The apparatus as disclosed in claim 1, said upper portion further comprising:

a bin door retaining brace provided to support said storage bin door when open and providing protection to said solar cell from impact when loading said storage bin with feeding materials.

4. The apparatus as disclosed in claim 1, wherein said manually operated closure means comprises:

a slotted drop port frame attached to said drop port;

a slide plate slidably engaged with said slotted drop port frame; and a slide plate arm having a first end attached to said slide plate, a second end forming a handle and an intermediate pivot joint located between said first end and said second end, said second end and handle extending through said front section.

5. The apparatus as disclosed in claim 1, wherein said programmable timer has a capability of one to eight feedings per day, depending on the size and feeding requirements of the livestock herd and a capability of adjusting the length of time of each feeding.

6. The apparatus as disclosed in claim 1, further comprising:

ramped wheel wells attached to said bed over said at least one two-wheeled axle, said wheel wells prohibiting feed from being trapped behind said wheel wells;

a stabilizer jack attached to said tongue of said trailer portion and a stabilizer jack attached to said trailer portion behind said bin structure;

said upper portion further comprising a bin door retaining brace provided to support said storage bin door when open and providing protection to said solar cell from impact when loading said storage bin with feeding materials;

said manually operated closure means further comprises a slotted drop port frame attached to said drop port, a slide plate slidably engaged with said slotted drop port frame, and a slide plate arm having a first end attached to said slide plate, a second end forming a handle and an intermediate pivot joint located between said first end and said second end, said second end and handle extending through said front section; and said programmable timer has a capability one to eight feedings per day, depending on the size and feeding requirements of the livestock herd and a capability of adjusting the length of time of each feeding.

* * * * *